(12) United States Patent
Khonsari et al.

(10) Patent No.: US 10,648,561 B2
(45) Date of Patent: May 12, 2020

(54) PISTON RING

(71) Applicants: Michael Khonsari, Baton Rouge, LA (US); Cong Shen, Rochester Hills, MI (US)

(72) Inventors: Michael Khonsari, Baton Rouge, LA (US); Cong Shen, Rochester Hills, MI (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 45 days.

(21) Appl. No.: 15/947,627

(22) Filed: Apr. 6, 2018

(65) Prior Publication Data

US 2018/0292007 A1    Oct. 11, 2018

Related U.S. Application Data

(60) Provisional application No. 62/483,111, filed on Apr. 7, 2017.

(51) Int. Cl.
*F16J 9/12*    (2006.01)
*F16J 9/20*    (2006.01)

(52) U.S. Cl.
CPC ..................... *F16J 9/20* (2013.01)

(58) Field of Classification Search
CPC ................. F16J 9/00; F16J 9/12; F16J 9/20
See application file for complete search history.

(56) References Cited

U.S. PATENT DOCUMENTS

| 6,176,492 | B1 * | 1/2001 | Sawai ............... | F16F 9/3405 |
| | | | | 188/322.18 |
| 7,267,045 | B2 | 9/2007 | Leweux et al. | |
| 8,313,104 | B2 * | 11/2012 | Maeda ............. | F16J 15/3208 |
| | | | | 277/459 |
| 8,381,695 | B2 | 2/2013 | Klink et al. | |
| 8,381,696 | B2 | 2/2013 | Urabe et al. | |

(Continued)

FOREIGN PATENT DOCUMENTS

WO    2015124163    8/2015

OTHER PUBLICATIONS

Y. Kligerman, I. Etsion, A. Shinkarenko, Improving Tribological Performance of Piston Rings by Partial Surface Texturing, vol. 127, Jul. 2005, ASME.

(Continued)

*Primary Examiner* — Gilbert Y Lee
(74) *Attorney, Agent, or Firm* — John B. Edel; Edel Patents LLC

(57) ABSTRACT

Piston rings are disclosed that relate to seal performance in piston containing machines such as piston driven engines. The piston rings may include a piston ring contact side for contact with a cylinder wall in which the piston ring contact side has multiple cavities configured on alternating edges of the piston ring contact side. Certain examples of these piston rings have cavities with an average depth that is less than $\frac{1}{300}^{th}$ of the piston ring width and which collectively occupy a cavity area percentage of the piston ring contact side that is between 20% and 30% of the total area of the piston ring contact side.

11 Claims, 3 Drawing Sheets

(56) References Cited

U.S. PATENT DOCUMENTS

| | | |
|---|---|---|
| 8,561,999 B2 | 10/2013 | Maeda et al. |
| 8,689,907 B2 | 4/2014 | Lu |
| 2013/0234400 A1 | 9/2013 | Iijima et al. |
| 2014/0170377 A1 | 6/2014 | Hsu et al. |
| 2014/0182540 A1 | 7/2014 | Johansson |

OTHER PUBLICATIONS

Arslan Ahmed . H. H. Masjuki . M. Varman . M. A. Kalam, M. Habibullah . K. A. H. Al Mahmud, An overview of geometrical parameters of surface texturing for piston/cylinder assembly and mechanical seals, Apr. 21, 2015.

Cong Shen, M. M. Khonsari, The effect of laser machined pockets on the lubrication of piston ring prototypes, Tribology International 101 (2016) 273-283, Apr. 16, 2016.

Cong Shen, M. M. Khonsari, Tribological and Sealing Performance of Laser Pocketed Piston Rings in a Diesel Engine, Tribol Lett (2016) 64:26 Oct. 1, 2016.

Cong Shen, M. M. Khonsari, Numerical optimization of texture shape for parallel surfaces under unidirectional and bidirectional sliding, Tribology International 82 (2015) 1-11, Sep. 30, 2014.

Ashwin Ramesh, thesis, Friction Characteristics of Microtextured Surfaces Under Hydrodynamic Lubrication, 2012.

M B Dobrica, M Fillon, M D Pascovici, and T Cicone, Optimizing surface texture for hydrodynamic lubricated contacts using a mass-conserving numerical approach, Proc. IMechE vol. 224 Part J: J. Engineering Tribology, 2010.

Costin Caciu, Etienne Decencière & Dominique Jeulin, Parametric Optimization of Periodic Textured Surfaces for Friction Reduction in Combustion Engines.

T. Ibatan A, M.S. Uddina, M.A.K. Chowdhury, Recent development on surface texturing in enhancing tribological performance of bearing sliders, Surface & Coatings Technology 272 (2015) 102-120, Apr. 17, 2015.

R. Rahmani, A. Shirvani and H. Shirvani, Optimised Textured Surfaces with Application in Piston-Ring/Cylinder Liner Contact, Tribology and Dynamics of Engine and Powertrain: Fundamentals, Applications and Future Trends, Woodhead Publishing, 2010, pp. 470-517.

\* cited by examiner

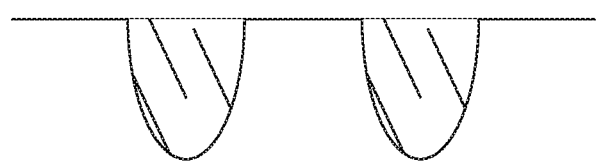
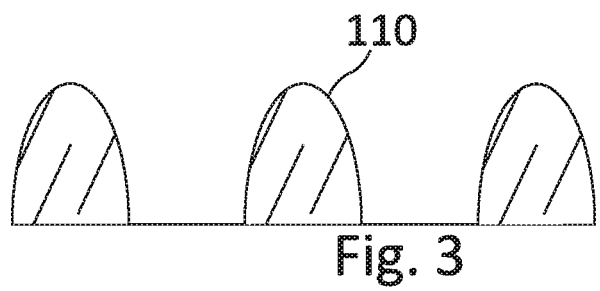
Fig. 3
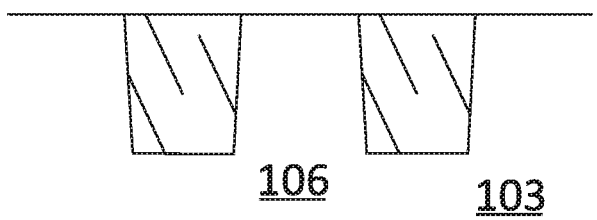
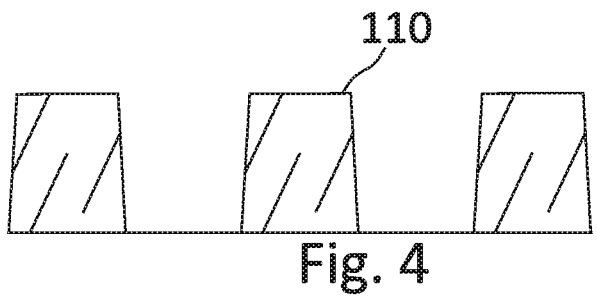
Fig. 4
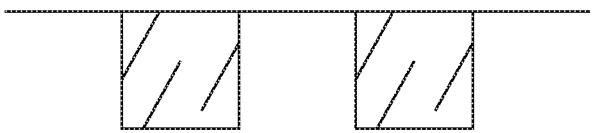
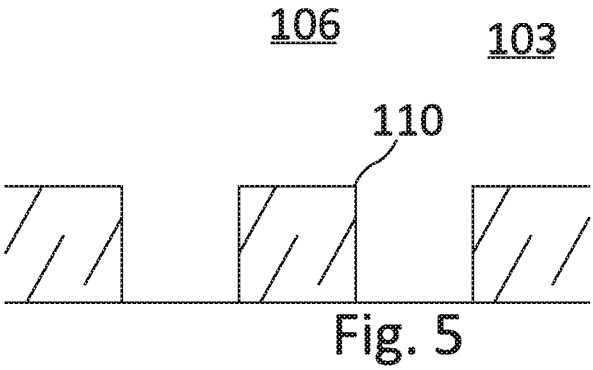
Fig. 5

PISTON RING

This application claims the benefit of provisional application No. 62/483,111 filed on Apr. 7, 2017 and entitled Piston Ring.

Piston rings described herein may be used in piston containing machines including internal combustion engines. Diesel and gasoline internal combustion engines along with compressors and all other reciprocating machines that utilize piston rings may benefit from the embodiments described herein. Piston rings described herein may have particular utility in reducing losses relating to friction and may increase the efficiency of machines in which they are used.

BRIEF DESCRIPTION OF THE DRAWINGS

FIG. 3 shows partial view of the sealing surface of piston ring.

FIG. 4 shows partial view of the sealing surface of piston ring.

FIG. 5 shows partial view of the sealing surface of piston ring.

DETAILED DESCRIPTION

Figure 1:
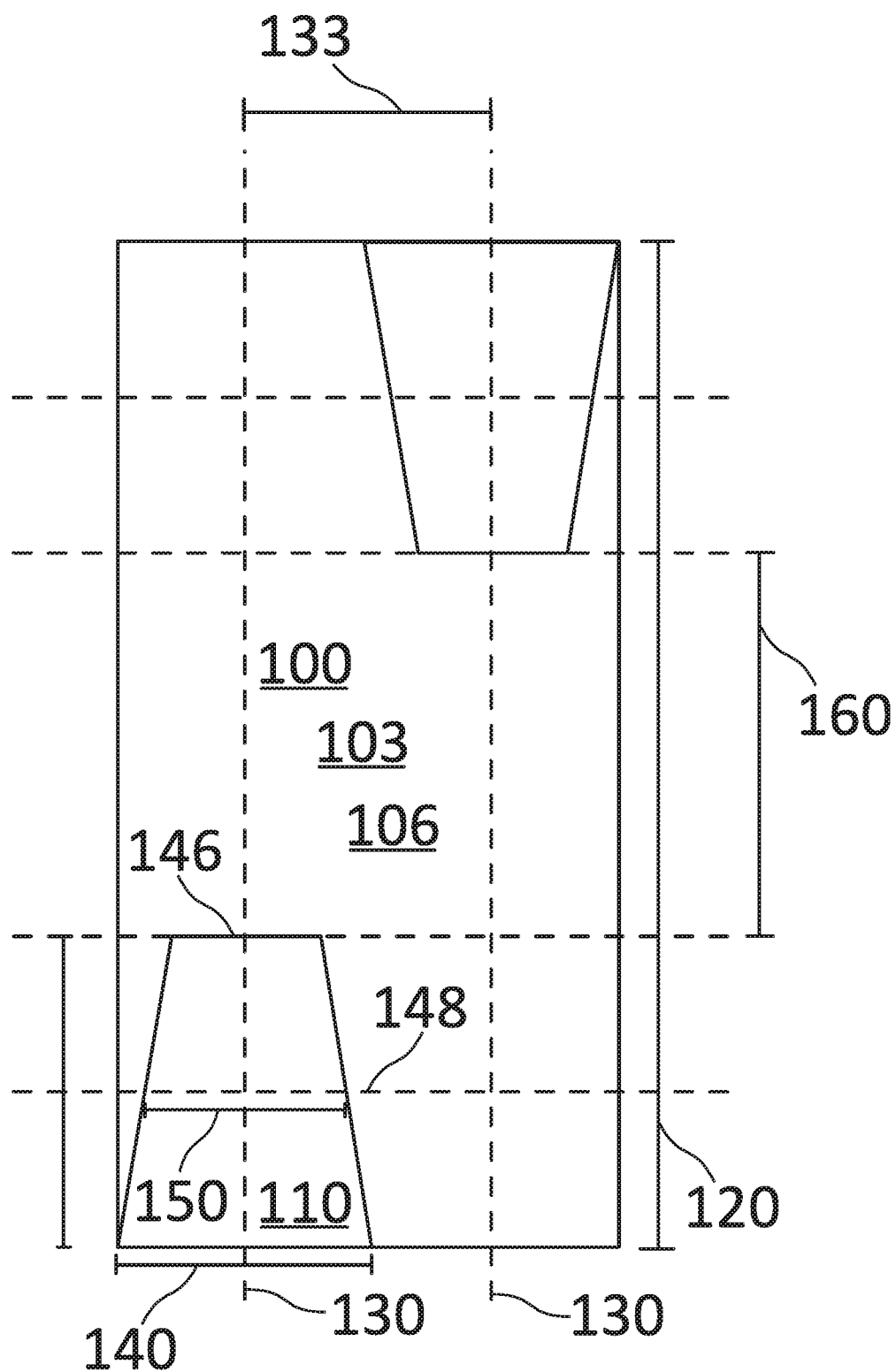
FIG. 1 shows partial view of the sealing surface of piston ring.

FIG. 1 of the present disclosure part is a partial view of the contact surface of piston ring. Depicted in FIG. 1 are Piston ring 100, Piston ring contact side 103, Land 106, Cavity 110, Ring width 120, Cavity centerline 130, Cavity centerline separation distance 133, Cavity edge width 140, Cavity half width edge distance 146, Cavity middle edge distance 148, Cavity middle width 150 and Piston ring center path span 160. Piston ring 100 may be a type of piston ring commonly found in gasoline, diesel or other similar motors. Piston ring contact side 103 is the surface of the Piston ring 100 that creates a seal with a surrounding cylinder bore. Land 106 denotes the portion of the Piston ring contact side 103 that is the predominant sealing surface of Piston ring 100 with Land 106 excluding any cavities. Cavity 110 is a recessed area that is part of Piston ring contact side 103. Ring width 120 represents the full width of Piston ring 100. Cavity centerline 130 is the line passing through the centroid of the cylindrical surface cut out of Piston ring contact side 103 by Cavity 110 that is parallel to the axis of symmetry of Piston ring 100. Cavity centerline separation distance 133 is the distance between two adjacent cavity center lines for cavities which may be adjacent but on opposite sides of Piston ring 100. Cavity edge width 140 is the width of Cavity 110 along the edge of Piston ring contact side 103. The location of cavity features may be characterized by a cavity edge distance which is the distance from the edge of the Piston ring contact side 103 expressed as a percentage of the Ring width 120. Because there are many potential geometries for the cavities and because many of those embodiments narrow rapidly or close abruptly at a distance at or near ¼ of the piston ring width, the phrase "cavity half width edge distance" is presented to provide a more precise indication of the distance from the edge of the piston at which substantial closure occurs. As used herein Cavity half width edge distance 146 and more generally the "cavity half width edge distance" is the distance from the edge of Piston ring contact side 103 at which the cavity width transitions from above half of the Cavity edge width 140 to below half of the Cavity edge width 140. Cavity middle edge distance 148 is the position that is one half of the Cavity half width edge distance 146. Cavity middle width 150 is the width of the cavity at the cavity edge distance that is one half of the Cavity half width edge distance 146. Piston ring center path span 160 is the path through the center of Ring width 120 that is between the Cavity half width edge distance 146 of the two alternating sides. In many cases and as depicted in FIG. 1, the alternating cavity pattern would make the Ring width 120 equivalent to the sum of Piston ring center path span 160 and twice the Cavity half width edge distance 146. Cavity 110 also has a cavity depth which may be dictated by the amount of material removed from that area by laser ablation or by other micro-machining or manufacturing methods. As that term is used herein, the "cavity area percentage" is the percentage of the piston ring contact side that is covered by the cavities.

In certain examples the geometry of the cavity is simply rectangular with a uniform depth. Such examples allow for a simpler set of terminology. In those cases, the Cavity edge width 140 would be the cavity width and the Cavity half width edge distance 146 would be the cavity length.

Figure 2:
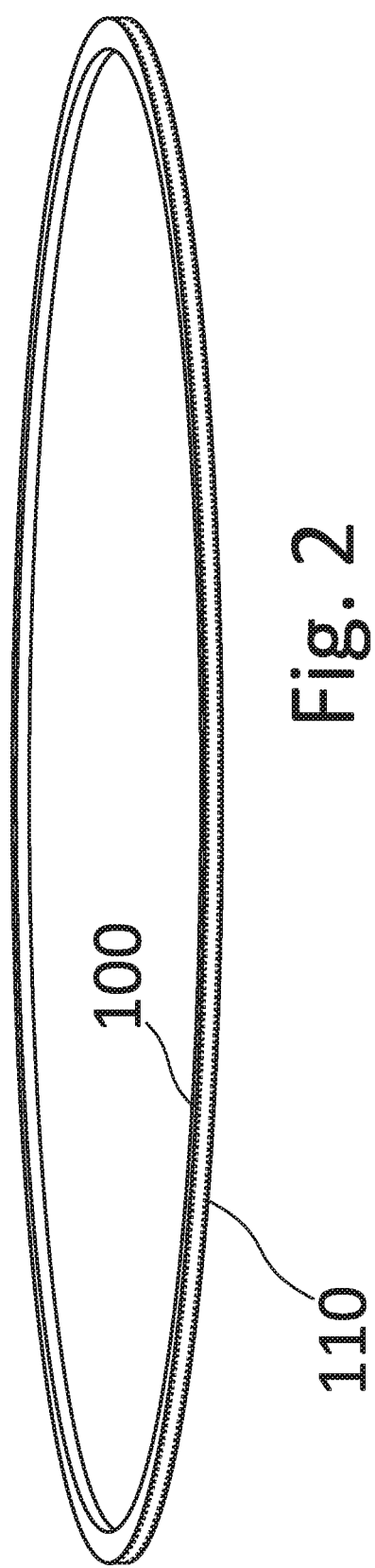
FIG. 2 shows a piston ring.

FIG. 2 depicts Cavity 110 arranged among a series of cavities along the sealing surface of Piston ring 100.

FIG. 3 depicts Piston ring contact side 103 including Land 106 and Cavity 110. Cavity 110 is a single cavity that is part of a series of cavities arranged along Piston ring contact side 103 in pattern that alternates sides. The cavities of FIG. 3 are configured as semi-ellipse cavities.

FIG. 4 depicts Piston ring contact side 103 including Land 106 and Cavity 110. Cavity 110 is a single cavity that is part of a series of cavities arranged along Piston ring contact side 103 in pattern that alternates sides. The cavities of FIG. 4 are configured as trapezoidal cavities.

FIG. 5 depicts Piston ring contact side 103 including Land 106 and Cavity 110. Cavity 110 is a single cavity that is part of a series of cavities arranged along Piston ring contact side 103 in pattern that alternates sides. The cavities of FIG. 5 are configured as rectangular cavities and more particularly are configured as square cavities.

A series of bench tests were conducted to investigate the frictional performance of flat piston ring prototypes having a 4 mm width with various cavity configurations. A laser was used to engrave appropriately shaped and distributed pockets on the simulated piston ring specimens to improve lubrication performance and reduce friction. Then, the pocketed piston ring specimens were prepared and friction tests were conducted on a CETR UMT-3 tribometer equipped with an instrumented reciprocating drive to simulate the contact between the piston ring and cylinder liner. The experiments used upper specimens made of low-carbon steel to replicate the segments of flat piston rings and lower specimens made of cast iron to simulate the cylinder liner. Reciprocating friction tests were conducted with a stroke length of 25 mm under full lubrication conditions. An additive-free SAE 10 oil with a dynamic viscosity of 0.06 Pa·s at room temperature was used in the tests. The design of the cavities was first generated with a CAD software and then imported into a laser machine to engrave desired patterns. The pocket depth was controlled by the number of times that the laser scans the specimen surface. A 12 kHz, 1064 nm wavelength Nd:Ytterbium fiber laser with a power of 10 W was used to create the pockets but laser characteristics may be varied according to various design considerations. The pocket depth was controlled by the power of the laser and the number of laser beam scans of the surface. Alternatively, the pockets can be created by other manufacturing tools.

Table 1 below shows rectangular cavity configurations that were tested, and Table 2 below shows non-rectangular cavity configurations that were tested. Test number R2 from Table 1 represents a test of an embodiment consistent with the configuration depicted in FIG. 5 of the drawings. As used in Table 1 the cavity spacing represents the length along an edge of the piston ring sealing face in which the cavity pattern repeats. For example, in the embodiment depicted in FIG. 5 matching the dimensions of test number R2 from Table 1, two full cavities, one on each side of the piston ring, would be located within each cavity spacing. Test number R6 from Table 1 was a control test having no cavities formed on the surface.

TABLE 1

| No. | Cavity length (mm) | Cavity width (mm) | Cavity spacing (mm) | Cavity area percentage (%) | Depth (μm) |
|---|---|---|---|---|---|
| R1 | 0.5 | 1.0 | 2.0 | 12.5 | 5.2 |
| R2 | 1.0 | 1.0 | 2.0 | 25.0 | 5.3 |
| R3 | 1.5 | 1.0 | 2.0 | 37.5 | 5.3 |
| R4 | 1.0 | 1.0 | 2.0 | 25.0 | 11.8 |
| R5 | 1.0 | 1.0 | 2.0 | 25.0 | 25.6 |
| R6 | 0.0 | 0.0 | 0.0 | 0.0 | 0.0 |

TABLE 2

| No. | Texture shape | Characteristic length (mm) | Cavity spacing (mm) | Cavity area percentage (%) | Depth (μm) |
|---|---|---|---|---|---|
| E1 | Semi-ellipse | Radius a = 1.27; b = 0.50 | 2.0 | 25.0 | 5.2 |
| T1 | Trapezoid | Side length a = 1.0; b = 0.60, h = 1.25 | 2.0 | 25.0 | 5.2 |

Test number E1 from Table 2 represents a test of an embodiment consistent with the configuration depicted in FIG. 3 of the drawings. In that embodiment, the cavity edge width was 1 mm and the cavity length was 1.27 mm. Test number T1 from Table 2 represents a test of an embodiment consistent with the configuration depicted in FIG. 4 of the drawings. In that embodiment, the cavity edge width was 1 mm and the cavity length was 1.25 mm. The width of the trapezoidal cavity side furthest from the edge of the piston ring was 0.6 mm.

Cavities at the leading edge of the piston ring may generate hydrodynamic pressure, akin to step bearings that enhance the function of the piston ring. Dimensions in cavities for piston rings with larger or smaller dimensions than those described herein may be adjusted proportionally based on the changes in ring width.

Comparing with the plain surface test, R6, the specimens with cavity area percentages of 12.5% and 25% had lower average friction coefficients at relatively high speeds (greater than 60 rpm). For example, under the rotational speed of 180 rpm and load of 40 N, the specimen with a cavity area percentage of 25% showed a friction reduction of 52%. For loading of both 40 N and 80 N, examples with a cavity area percentage of 25% provided consistently better performance than other cavity area percentages. Specimens with cavity area percentages of 37.5% had the highest coefficient of friction.

The cavities, when appropriately sized, may function as tiny step bearings generating additional hydrodynamic pressure and increasing the load-carrying capacity with increases in speed. The specimens tested were operating in the mixed lubrication regime. Higher sliding velocities lead to greater hydrodynamic lift and lower friction. This may be attributed to the cavities providing additional load-carrying support and increasing the maximum film thickness at the high speeds found around the mid-stroke. Another reason may be that the oil-reservoir associated with the cavities, helps supply oil between the surfaces to reduce asperity contacts at low speeds. Tested pocket depths ranged from 5.3 μm to 25.6 μm. Under the conditions tested, the specimens with pocket depths of 5.3 μm had the lowest overall coefficient of friction. Examples with a cavity area percentage of 25% showed the strongest indicator of overall performance, but the semi-ellipse and trapezoid pockets showed a slightly lower coefficient of friction than the square example. Cavity area percentages with a large deviation from 25% lost the benefits of the reduced coefficient of friction. Under the conditions tested, the pockets with a cavity area percentage of 25% and depth of 5 μm can greatly lower the friction of piston ring/cylinder liner contact. However, cavities with large cavity area percentage or cavity depth that was too large did not show friction reduction effect.

A series of tests were conducted to evaluate the sealing performance of piston rings with these types of cavity configurations between an operating piston and a cylinder liner under simulated operating conditions. The testing rig was constructed from diesel engine parts. The experiments were conducted using a custom-built reciprocating piston test apparatus that enables both friction and compression pressure measurements with a stroke length of 114.3 mm. The piston ring-pack used included three compression rings and two oil control rings. The micro pockets were machined on the sliding surface of the compression rings made of cast iron with a diameter of 99 mm and a width of 2.36 mm. All the compression rings had a flat surface with a surface roughness ($R_a$) of 0.32 μm. Rings with cavities outperformed the rings without cavities over a wide range of speeds. The friction test results show that the lasered cavities lead to a reduction of up to about 15% in the total friction between cylinder liner and piston assembly over a wide speed range. The cavities were configured in a pattern comparable to the patterns depicted in FIGS. 1 and 4 and the dimensions of the individual pockets were according to Table 3 below.

TABLE 3

| Parameters | Value |
|---|---|
| Pocket shape | Trapezoidal |
| Characteristic length | a = 0.6 mm; b = 0.36 mm; h = 0.75 mm |
| Pocket depth | 3.9-4.2 μm |
| Pocket spacing | 2.8° (circumferentially) |
| Total no. of pockets | 516 |
| Area ratio | 25.3% |

In an embodiment of the invention, the cavity centerline separation distance expressed as a percentage of the ring width may, for example, be 25.0% with certain examples falling between 8.0 and 70.0% and a significant number of those examples falling between 16.5 and 47.5%.

The average cavity depth may, for example, be 4.0 μm with certain examples falling between 1.0 and 14.0 μm and a significant number of those examples falling between 2.5 and 9.0 μm.

The cavity half width edge distance expressed as a percentage of the ring width may, for example, be 32.0% with certain examples falling between 10.0 and 45.0% and a significant number of those examples falling between 21.0 and 38.5%.

The cavity middle width expressed as a percentage of the ring width may, for example, be 20.0% with certain examples falling between 8.0 and 60.0% and a significant number of those examples falling between 14.0 and 40.0%.

The cavity edge width expressed as a percentage of the ring width may, for example, be 25.0% with certain examples falling between 10.0 and 75.0% and a significant number of those examples falling between 17.5 and 50.0%. The cavity edge width may further be greater than or equal to the cavity middle width.

Piston ring center path span expressed as a percentage of the ring width may, for example, be 36.0% with certain examples falling between 15.0 and 75.0% and a significant number of those examples falling between 25.5 and 55.5%.

The cavity area percentage may, for example, be 25.0% with certain examples falling between 7.0 and 55.0% and a significant number of those examples falling between 16.0 and 40.0%.

A significant variety of cavity configurations may be employed that are consistent with the present disclosure. In certain embodiments, a uniform cavity depth may be employed. In other embodiments, a variable cavity depth may be employed particularly to develop a depth pattern within the cavity. The depth pattern or internal structure of the cavities may be achieved by varying the intensity or duration of the laser producing the cavities. Additional surface treatments may be used in conjunction with the embodiments disclosed herein. In certain embodiments, the surface may be coated and then engraved with cavities. In others, the surface may be coated after creating the cavities.

Piston rings described herein may, for example comprise a piston ring contact side configured for sealing contact with a cylinder wall; a plurality of cavities situated on the piston ring contact side; a first cavity on the piston ring contact side selected from the plurality of cavities wherein the first cavity is on a first edge of the piston ring contact side; a second cavity on the piston ring contact side selected from the plurality of cavities wherein the second cavity is on a second edge of the piston ring contact side and a ring width being the distance between the first edge and the second edge; such that the first cavity may extend from the first edge of the piston ring contact side toward the second edge contact side by a cavity extent which is between 20% and 35% of the ring width; such that an average depth of the first cavity is less than $\frac{1}{300}^{th}$ of the ring width; such that the plurality of cavities occupies between 40% and 60% of a length of the first edge of the piston ring contact side and such that the plurality of cavities occupies a cavity area percentage of the piston ring contact side and the cavity area percentage is between 20% and 30%. In a related example, a first cavity centerline may be perpendicular to the first edge and pass through a center of the first cavity; a second cavity centerline may be perpendicular to the first edge and pass through a center of the second cavity and a cavity centerline separation distance may be the distance between the first cavity centerline and the second cavity centerline; such that the cavity centerline separation distance is between 16.5% and 47.5% of the ring width. In a related example, the first cavity and the second cavity may be adjacent cavities along a circumference of the piston ring contact side. In a related example, a first cavity edge width of the first cavity along the first edge of the piston ring contact side may be as wide or wider than a remainder of the first cavity. In a related example, the first cavity may be trapezoidal. In another related example, the first cavity may be square.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:
1. A piston ring comprising:
  a. a piston ring contact side configured for sealing contact with a cylinder wall;
  b. a plurality of cavities situated on the piston ring contact side;
  c. a first cavity on the piston ring contact side selected from the plurality of cavities wherein the first cavity is on a first edge of the piston ring contact side;
  d. a second cavity on the piston ring contact side selected from the plurality of cavities wherein the second cavity is on a second edge of the piston ring contact side;
  e. a ring width being the distance between the first edge and the second edge;
  f. a first cavity centerline perpendicular to the first edge and passing through a center of the first cavity;
  g. a second cavity centerline perpendicular to the first edge passing through a center of the second cavity and
  h. a cavity centerline separation distance being the distance between the first cavity centerline and the second cavity centerline;
  i. wherein the cavity centerline separation distance is between 16.5% and 47.5% of the ring width;
  j. wherein the first cavity extends from the first edge of the piston ring contact side toward the second edge contact side by a cavity extent which is between 20% and 35% of the ring width;
  k. wherein an average depth of the first cavity is less than $\frac{1}{300}^{th}$ of the ring width;
  l. wherein the plurality of cavities occupies between 40% and 60% of a length of the first edge of the piston ring contact side;
  m. wherein the plurality of cavities occupies a cavity area percentage of the piston ring contact side and the cavity area percentage is between 20% and 30% and
  n. wherein the piston ring is metal.

2. The piston ring of claim 1 wherein the first cavity and the second cavity are adjacent cavities along a circumference of the piston ring contact side.

3. The piston ring of claim 1 wherein a first cavity edge width of the first cavity along the first edge of the piston ring contact side is as wide or wider than a remainder of the first cavity.

4. The piston ring of claim 1 wherein the first cavity is trapezoidal.

5. The piston ring of claim 1 wherein the first cavity is square.

6. A piston ring comprising:
  a. a piston ring contact side configured for sealing contact with a cylinder wall;
  b. a first edge of the piston ring contact side;
  c. a second edge of the piston ring contact side which is opposite the first edge of the piston ring contact side;
  d. a plurality of cavities comprising first edge type cavities and second edge type cavities;

e. a repeating sequence of the first edge type cavities and the second edge type cavities arranged along the piston ring contact side;
f. wherein each of the first edge type cavities comprise a single first edge cavity situated along the first edge of the piston ring contact side such that the single first edge cavity has a first edge type cavity centerline perpendicular to the first edge and passing through a center of the single first edge cavity and the single first edge cavity is the only cavity situated along the first edge type cavity centerline;
g. wherein each of the second edge type cavities comprise a single second edge cavity situated along the second edge of the piston ring contact side such that the single second edge cavity has a second edge type cavity centerline perpendicular to the second edge and passing through a center of the single second edge cavity and the single second edge cavity is the only cavity situated along the second edge type cavity centerline;
h. wherein the first edge type cavities alternate with the second edge type cavities along the length of the piston ring contact side;
i. a ring width being the distance between the first edge and the second edge;
j. wherein most of the plurality of cavities have an average depth that is less than $1/300^{th}$ of the ring width;
k. wherein the plurality of cavities occupies a cavity area percentage of the piston ring contact side and the cavity area percentage is between 20% and 30% and
l. wherein the piston ring is metal.

7. The piston ring of claim 6 wherein the average distance between adjacent first edge type cavity centerlines and second edge type cavity centerlines is between 16.5% and 47.5% of the ring width.

8. The piston ring of claim 6 wherein the first edge type cavities occupy between 40% and 60% of a length of the first edge of the piston ring contact side.

9. The piston ring of claim 6 wherein a first cavity edge width of the single first edge cavity along the first edge of the piston ring contact side is as wide or wider than a remainder of the single first edge cavity.

10. The piston ring of claim 6 wherein the single first edge cavity is trapezoidal.

11. The piston ring of claim 6 wherein the single first edge cavity is square.

* * * * *